United States Patent [19]
Ryder, Jr.

[11] Patent Number: 5,269,639
[45] Date of Patent: Dec. 14, 1993

[54] SYSTEM FOR SHIPPING PRODUCTS AND STABILIZING THEM FROM SHIFTING SIDEWISE ON VEHICLE

[75] Inventor: Raymond G. Ryder, Jr., Columbus, Ohio

[73] Assignee: Crane Plastics Company, Columbus, Ohio

[21] Appl. No.: 760,283

[22] Filed: Sep. 16, 1991

[51] Int. Cl.$^5$ ............................................. B61D 45/00
[52] U.S. Cl. ..................................... 410/122; 410/40; 410/155; 410/95
[58] Field of Search ............ 410/32, 35, 36, 39, 410/43, 42, 97–100, 94, 95, 122, 129, 130, 132, 139, 121, 122, 153, 155, 156; 206/160, 516, 821; 211/59.4

[56] References Cited

U.S. PATENT DOCUMENTS

| | | | |
|---|---|---|---|
| 2,248,119 | 7/1941 | Reed et al. | 410/35 |
| 2,283,930 | 5/1942 | Hedges | 410/40 X |
| 2,284,616 | 5/1942 | Hedges | 410/40 X |
| 2,355,867 | 8/1944 | Jarvis | 410/153 X |
| 2,498,804 | 2/1950 | Goff | 410/155 |
| 2,539,809 | 1/1951 | Buckley | 211/59 A |
| 2,608,165 | 8/1952 | Pierce | 410/155 |
| 3,023,712 | 3/1962 | Nagler | 410/155 |
| 3,301,405 | 1/1967 | Turney | 410/32 X |
| 3,407,753 | 10/1968 | Stafford, Jr. | 105/367 |
| 3,504,404 | 4/1970 | Rehnstrom et al. | 24/16 |
| 4,011,632 | 3/1977 | MacDonald | 24/16 R |
| 4,077,331 | 3/1978 | Val Verde | 105/463 |
| 4,147,112 | 4/1979 | Green et al. | 105/463 |
| 4,242,021 | 12/1980 | Sloane | 410/96 |
| 4,317,645 | 3/1982 | Van Gompel | 410/94 |
| 4,576,531 | 3/1986 | Cosnet | 410/36 |
| 4,770,578 | 9/1988 | Coleman | 410/34 |
| 4,784,547 | 11/1988 | Prinz et al. | 410/52 |

FOREIGN PATENT DOCUMENTS

| | | | |
|---|---|---|---|
| 1273473 | 5/1972 | United Kingdom | 206/516 |
| 2059905 | 4/1981 | United Kingdom | 206/516 |
| 2185461 | 7/1987 | United Kingdom | 206/821 |

Primary Examiner—Michael S. Huppert
Assistant Examiner—James T. Eller, Jr.
Attorney, Agent, or Firm—John L. Gray

[57] ABSTRACT

A system for shipping product on a vehicle comprising a series of rectangular containment elements surrounding a plurality of products thus together constituting a plurality of units with a T-shaped support positioned between each of the containment elements and thus stabilizing the units and preventing sidewise shifting.

6 Claims, 2 Drawing Sheets

SYSTEM FOR SHIPPING PRODUCTS AND STABILIZING THEM FROM SHIFTING SIDEWISE ON VEHICLE

BACKGROUND OF THE INVENTION

Problems have arisen in stabilizing loads on flatbed vehicles when shipping stacked product. In particular, difficulties have been encountered in shipping vinyl siding on flatbed trucks. Vinyl siding normally is shipped in cardboard boxes containing 24 pieces of siding, the boxes being approximately 13½ inches wide, 5 inches high, and 12 feet 6 inches long. Attempts have been made to stabilize such boxes of vinyl siding by stacking them in units that are four units wide and seven units high and containing them with wooden frameworks, preferably reinforced at the corners with metal L-shaped brackets. Such formed units may be stacked two high, two wide on a flatbed truck, and up to a total of six units may be conveniently thus carried when strapped down. However, the loads tend to shift even when so secured creating a traffic hazard in that a truck could lose a part of its load and also increasing costs since trucks have to stop and reload or reposition the units.

SUMMARY OF THE INVENTION

The invention involves the use of an additional element which provides stability to the entire load and eliminates dangerous and uneconomical problems associated with the current state of the art. This is done merely by utilizing three strategically positioned T-shaped elements to engage some of the containment elements on the units.

It is therefore an object of this invention to provide a new system for shipping product on a vehicle which employs a simple, cheap T-shaped member in combination with conventional shipping containment units to provide a stable system that prevents loads from shifting.

These, together with other objects and advantages of the invention will become more readily apparent to those skilled in the art when the following general statements and descriptions are read in the light of the appended drawings.

DETAILED DESCRIPTION OF THE INVENTION

Figure 1:
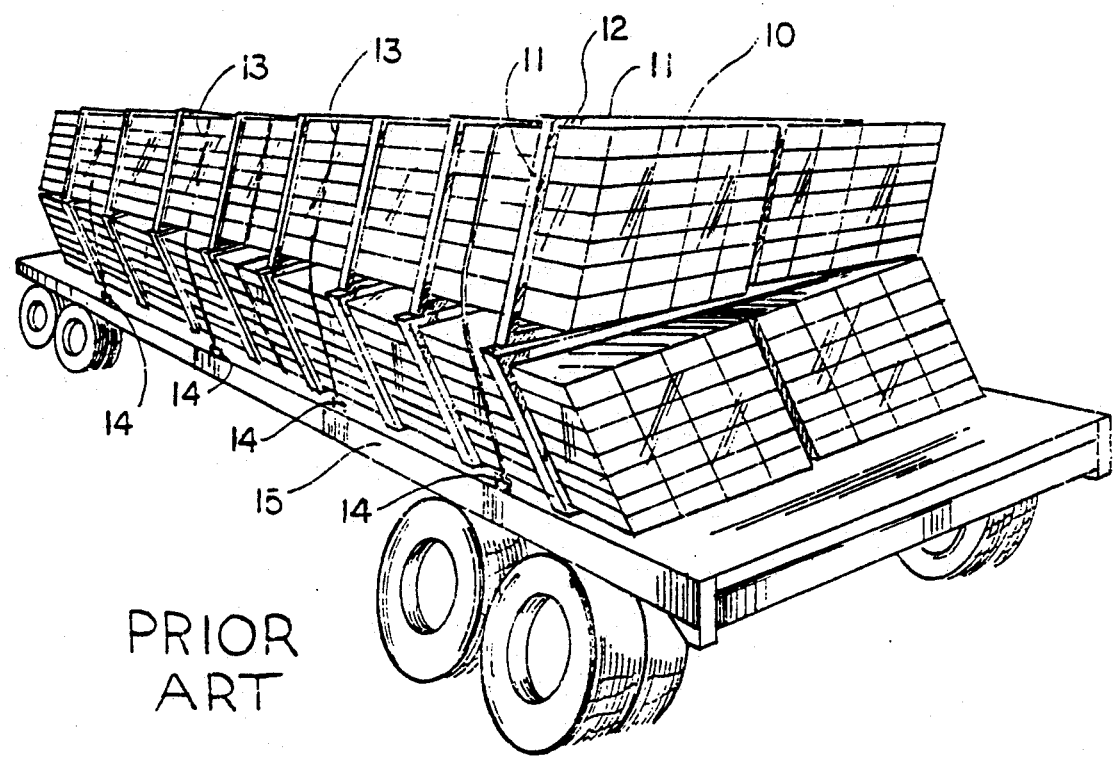
FIG. 1 shows the prior art and the disadvantages associated therewith.

Referring now more particularly to FIG. 1, the conventional type of technique in use prior to applicant's invention is shown. For illustration purposes only, the product 10 being shipped comprises cardboard containers of vinyl sidewall approximately 50"×34"×12' 6" in size. As shown, there are four of the product 10 stacked seven high and contained in wooden elements 11—11 completely surrounding each stack. Usually approximately five such wooden containment elements 11—11 are needed for each 28 groups of product 10. As shown, containment units 11—11 are reinforced at their corners by L-shaped brackets 12. Even though held down by straps 13—13 connected to tie downs 14—14 on the flatbed truck frame 15, the load tends to shift laterally and longitudinally, as shown in FIG. 1, with the attendant disadvantages described above.

Figure 2:
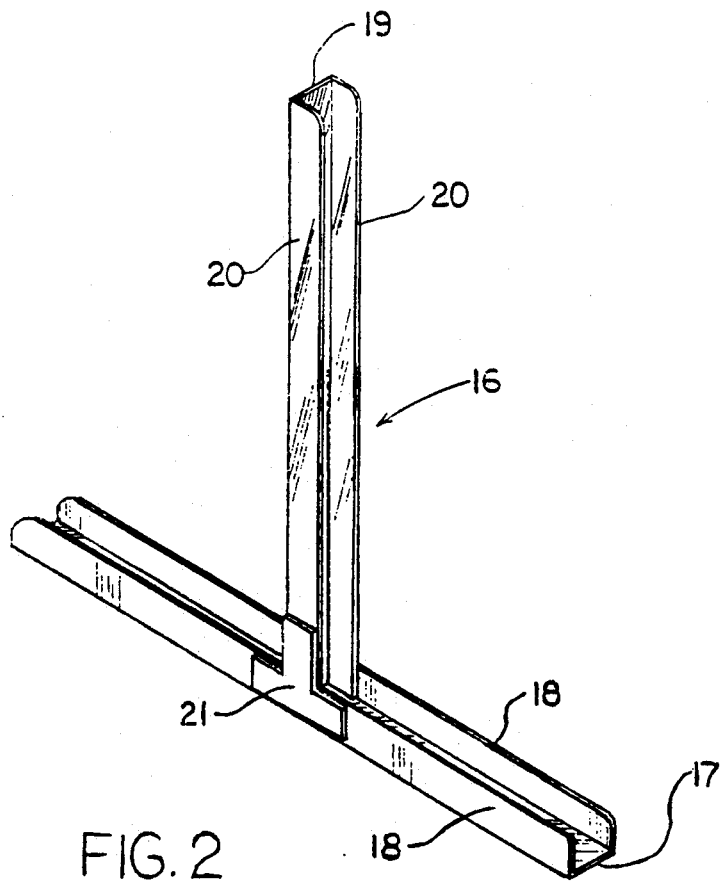
FIG. 2 is a perspective view of the T-shaped element constituting a portion of this invention.

Referring now to FIG. 2, there is shown a T-shaped member 16 having an upstanding U-shaped horizontal member 17 provided with upstanding channel members 18—18. The horizontal member 17 is welded to vertical member 19 provided on at least one side with parallel upstanding channel members 20—20. Preferably the joint formed between the horizontal member 17 and the vertical member 19 has welded thereto a reinforcing T-shaped member 21. This unit may be made of C×6.7 steel channel or C5×9.0 steel channel. Aluminum 6061-T6 channel, and HC-7, HC-18, and HC 23 could be used in place of steel. Plastic polycarbonate could also be used to form the unit through injection molding. The units 17 and 19 are of a size to receive the wooden members 11—11. The channel members 18—18 and 20—20 should not greatly exceed the thickness of the members 11—11 in either direction.

Figure 3:
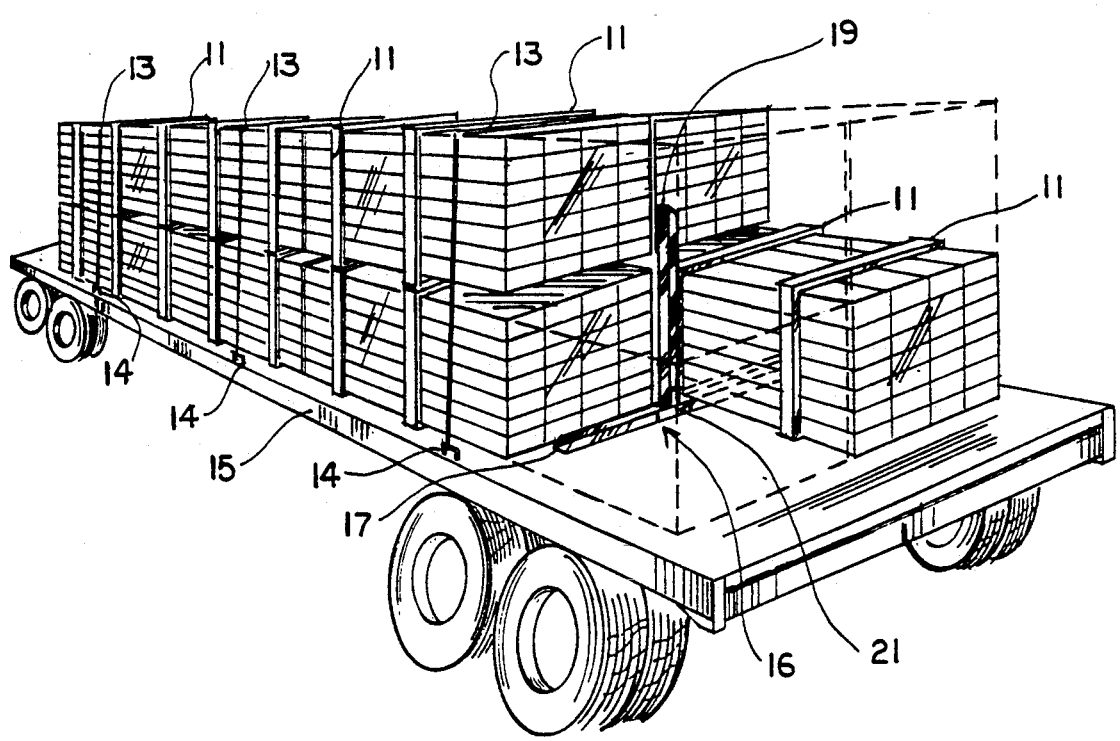
FIG. 3 shows the placement of said T-shaped element as an integral part of the system for shipping product.

Referring now to FIG. 3, the T-bar unit 16 comprising horizontal member 17 and vertical member 19 are positioned on the flatbed truck body 15 so that they are approximately midway between four sets of units composed of the 28 groups of product 10 surrounded by the wooden containment elements 11—11. Usually there are five such containment elements 11—11 equi-spaced along said 28 groups of product 10.

It will be seen that the horizontal member 17 engages a portion of the lower containment element of adjacently positioned groups of product 10 by fitting containment element 11 in between upstanding channel members 18—18. Similarly, at least one of the corresponding vertical elements 11—11 engage the vertical member 19 by fitting between channel members 20—20.

Utilizing the dimensions described above for packages of vinyl siding, a maximum of 12 groups of 28 may be loaded on a conventional flatbed truck using three T-shaped supports 16 positioned in the middle of each group. It will be noted that the length of vertical member 19 is long enough so that it extends upwardly and engages containment elements 11—11 surrounding one of the upper 28 groups of product 10.

Surprisingly with the mere inner positioning of three such T-shaped supports 16 there has been no vertical, horizontal, or longitudinal movement of product 10 shipped in this manner. Furthermore, the L-shaped brackets 12 may be omitted.

While this invention has been described in its preferred embodiment, it is to be appreciated that variations therefrom may be made without departing from the true scope and spirit of the invention.

What is claimed is:

1. A system for shipping products on a vehicle as units, each of said units comprising a set of rectangular containment elements surrounding a plurality of said products, said system comprising:
   a T-shaped unitary support comprising a horizontal member of a size so as to be placed in the center of said vehicle and not extend beyond the width of said vehicle, said support having a shape in cross section so as to receive a portion of said containment elements therein of two of said units when placed in side by side relationship on said vehicle, said support also including a vertical member attached to said horizontal member and having a shape in cross section so as to receive a portion of said containment element therein of at least one of said two units when so positioned on said vehicle.

2. The system of claim 1 wherein the containment elements are essentially rectangular in cross section.

3. The system of claim 1 wherein the horizontal member of said support comprises an essentially U-shaped member in cross section with an open end of said U-shaped member extending upwardly from said vehicle.

4. The system of claim 1 wherein said vehicle has a long axis and a short axis at right angles thereto and, wherein said units which have said containment elements received in said horizontal member of said support are in side by side relationship along the long axis of said vehicle.

5. The system for shipping products of claim 1 wherein said vehicle is a flatbed truck trailer.

6. The system of claim 5 provided with straps wherein said units are additionally secured by straps placed thereover and attached to the sides of said truck trailer.

* * * * *